Sept. 4, 1956    V. A. BREITENBACH    2,761,803
METHOD OF EDGE-FUSING STACKS OF WAX SLABS
Filed Aug. 30, 1951
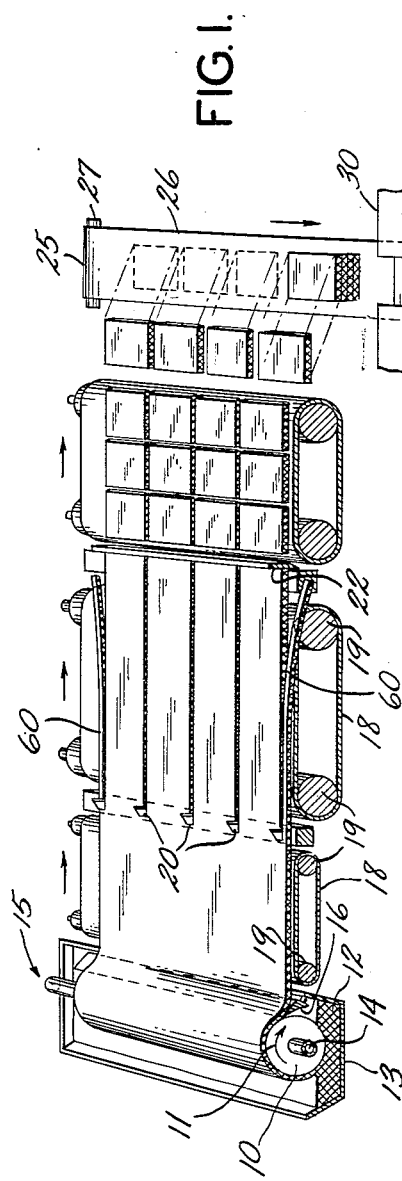
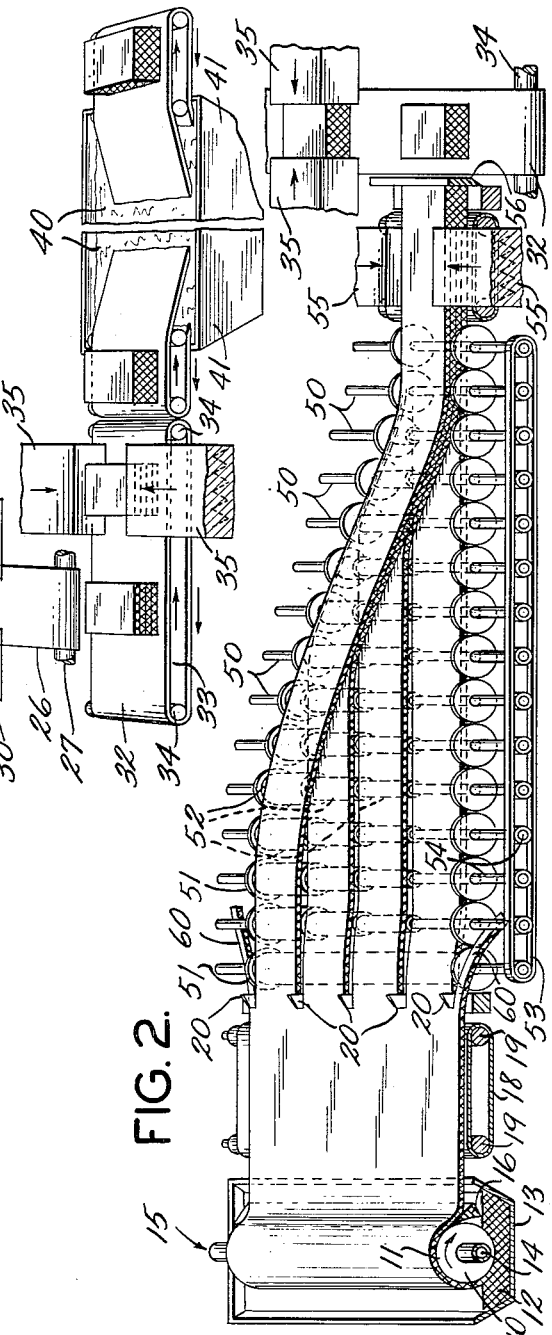
INVENTOR.
VERNON A. BREITENBACH
BY
Campbell, Brumbaugh, Free + Graves
his    ATTORNEYS United States Patent Office 2,761,803
Patented Sept. 4, 1956

2,761,803

METHOD OF EDGE-FUSING STACKS OF WAX SLABS

Vernon A. Breitenbach, Cleveland, Ohio, assignor to The Standard Oil Company, Cleveland, Ohio, a corporation of Ohio Application August 30, 1951, Serial No. 244,365

6 Claims. (Cl. 154—116)

The present invention relates to a method of continuously forming stacks of wax sheets which are bonded together at their edges.

Conventional methods of molding wax involve the filling of a trough-like mold of the desired size with wax in the liquid state and subsequently cooling the wax by circulating cooling water through and around walls of the mold. In this type of process, the wax adjacent the cooled walls of the mold solidifies very quickly and the layer of solid wax adjacent the cooled walls gradually increases in thickness as more heat is removed. Eventually all of the wax in the mold becomes solidified so that it can be removed from the mold and packaged for shipment.

These conventional methods are very inefficient because the poor heat conductivity of the waxes makes it very difficult to cool the interior of the wax mass in the trough-like molds. This has the effect of extending the molding time very considerably and permits wide differences in temperature to exist between the cooled outer layer of wax and the liquid interior. The magnitude of the temperature gradient in turn causes the wax in the mold to warp during the cooling process and the formation of holes in the molded product.

Furthermore, the inherent slowness of the process, the necessarily low rate of production, the space the equipment occupies in the plant, and the cost of labor involved in filling the molds with molten wax, removing the slabs of molded wax from the molds and in the subsequent cutting, inspection and packaging operations, all combine to make the labor and plant overhead so high as to usually be out of proportion with the initial cost and selling price of the wax.

Inasmuch as the plastic range, i. e., the difference between the solidification and liquefaction temperature of most waxes covers a very short range, in many cases not more than about 5° F., and since it is impracticable and very difficult to control the temperature of a wax within such narrow limits, waxes do not lend themselves readily to regulation of temperatures as necessitated in extrusion processes such as are employed in the shaping of ice cream, margarine and other plastic materials which have a relatively wide plastic range.

In accordance with the invention a layer of wax heated to a temperature slightly higher than its melting point is applied to a continuously rotating cylinderical cooling surface which is maintained at a temperature below the setting point of the wax. The cooling surfaces on which the layer of wax is deposited may be cooled by any cooling medium such as circulating water, refrigerating coil, and the like, beneath or in contact with said surfaces. The layer of wax may be applied to the cooling surfaces by moving the surfaces through tanks of molten wax, by spraying or pouring molten wax on this cooling surface or by any similar means.

The solidified sheet of wax in a plastic and pliable stage is removed from the rotating cooling surfaces onto a conveying device. As the removed sheet of wax is moved along the conveyor it is cut into narrow, ribbon-like strips of the proper width by means of knife blades protruding above the level of the conveyor or by wires, saws or the like. Further along the strips of wax are cut transversely to form short bars or squares of wax, and are sealed on opposite sides thereof.

In one embodiment of the invention, the wax rectangles drop from the conveyor onto an alternately stationary and moving transverse conveying device. A predetermined number of rows of the wax rectangles are deposited upon each other in a stack on the transverse conveyor before it moves forward to carry them between a pair of heated metal plates where opposite sides of the stacked rectangles of wax are melted slightly and fused in a fragile bond. After passing through the heated metal plates, the resulting wax blocks are transferred to a second conveying means at right angles to the transverse conveyor whereby the wax blocks are carried through a second set of heated metal plates to bond the other pair of opposite sides. From this point, they are conducted along a conveying means, through a body of cooling medium in a container, such as water in a trough, to cool the heated surfaces of the wax blocks which are then withdrawn and dried ready for packaging.

In another embodiment of the invention, the wax sheet is split into strips and first stacked and sealed on two sides before it is finally cut into the wax rectangles and sealed on the opposite sides.

This invention is particularly adapted to the molding of waxes from petroleum sources, such as paraffin wax, because this type of wax has a narrow temperature range over which it is plastic and low coefficient of thermal conductivity which renders it difficult to mold by other processes. However, other waxes may be molded by means of the process described herein.

One important advantage of the present invention is that it provides a method of cooling, solidifying and preparing wax for packaging in a much more efficient manner at any desired thickness than was heretofore considered possible. This advantage is inherent in the method of the invention, because the thickness of the wax which must be initially cooled is very small, so that cooling is uniform and is obtained before it is sized and cut into wax blocks.

Another advantage of the present invention is that it is practically automatic and, therefore, requires a minimum of labor.

Still another advantage of the invention is that it is capable of continuously producing wax blocks or cakes of any desired thickness and width.

Another feature of the invention is the preparation of a uniform block of wax composed by a plurality of relatively thin layers of wax, integrally annealed along the edges and lying contiguous one to another in such a manner that adjacent surfaces are unannealed, whereby any desired thickness or number of layers of wax may be readily separated from the block. In this way, it is easy to remove only the amount of wax from the block that is needed at any one time and avoids the necessity of having to cut the block and the wastefulness of taking off too much wax at any one time. Small variations in quantity are accommodated readily due to the thinness and small proportion of each strip.

Another advantage of the present invention is that it is capable of producing uniformly solid layers of wax adapted for processing into easily separable blocks or cakes not having air-holes or other perforations as are often found in the center and tops of cakes molded in the conventional molds.

Another advantage of this invention is that the stacks of wax rectangles are conveyed to continuous and automatic sealing equipment to produce an improved sectionally separable edge-joined block or cake of wax.

A further advantage of the present invention is that the apparatus is extremely flexible in that it is easily adaptable to waxes of different melting points, different cooling media, different production rates and different thicknesses and widths of the blocks produced. Thus, for example, if the apparatus is to be adjusted for a higher melting point wax than previously molded the rate of rotation of the rollers and, if necessary, of the conveyor, simply needs to be increased or the temperature of the cooling medium may be increased. If cooling water is used to cool the rollers, and it is found that the temperature of the water is increased, it is necessary only to increase the rate of rotation of the drums and the rate of flow of wax to the rollers. The cutters may be adjusted to produce various widths of wax strips and different numbers of wax sections may be stacked before sealing.

These and other advantages of the invention as well as the utility and the objects thereof will become apparent from the detailed description made with reference to the accompanying drawing wherein:

Figure 1 is a schematic illustration of an apparatus for carrying out the present invention; and Figure 2 is a partial schematic illustration of another apparatus for carrying out the invention.

The apparatus illustrated in Figure 1 comprises a roller 10 which rotates in the direction of the arrow 11. A lower portion of the roller passes through a body 12 of molten wax in wax container 13 where a layer of wax adheres to the rotating surfaces of the roller. A cooling medium, such as water, is introduced into fluid inlet 14, flows through the rotating cylindrical roller and is removed through fluid outlet 15. The solidified plastic layer of wax is removed from the rotating cylinder by means of a sharp-edged guide 16, such as a doctor's knife, which rides against the surface of the roller and separates the layer of wax therefrom. The layer of wax is picked up by a conveyor system which may consist of conveyor belt 18, which travels about conveyor rollers 19. The sheet of wax is cut into narrow strips or ribbons of wax by cutting means 20, which may consist of knife blades, saws or relatively fine wire extending from below to above the sheet of wax. Further along the conveyor the strips of wax are cut into slabs of rectangular bars or squares of appropriate sizes by a cutter 22 which may likewise consist of a knife blade operating against a block, or of a saw or wire cutter.

After being cut, the rectangles of wax are conveyed to a transverse conveyor system 25, which consists of the conveyor belt 26, travelling about rollers 27. This conveyor acts intermittently so that several layers of the cut wax will be stacked on top of each other before it moves the resulting stack. When a number, sufficient to form a block of desired thickness, of the rows of wax rectangles are stacked on the transverse conveyor, it is automatically released and moves forward sufficiently to expose a clear area for receiving additional rectangles in preparing another group of stacks.

As the stacks move forward they pass between a pair of heated metal plates 30 which warm and fuse the edges of the individual slabs of wax on opposite sides of the stack. The partially bonded slabs of wax are carried forward, where they are deposited on a second horizontal conveyor device 32 which consists of a conveyor belt 33 and conveyor rolls 34. On the second conveyor the wax stacks are carried forward between a second set of heated metal plates 35, which seals the remaining sides of the wax stacks to form sectionally-separable wax blocks. The wax blocks are then transferred to another section of the horizontal conveyor and carried through a cooling medium 40, such as water, in a container 41, such as a trough. On emerging from the cooling medium the blocks are dried and are ready for packaging and marketing.

In a modification of the process shown in Figure 2, the molten wax is collected onto a cooling cylindrical roller as above and cut or slit into narrow strips or ribbons of wax which are immediately stacked on top of each other by any suitable device such as the system of rollers shown where a series of rollers 50 of progressively decreasing length guide the strips of wax into superposed position. The successive rollers may be provided with end discs 51 which, being of diameter greater than the rollers, serve as guiding stops for the outer strips of wax. The successive rollers may also be constructed of a group of telescoping sections 52 as shown, each section of the first roller being of length equal to the width of a strip of wax and each section larger in outside diameter than the next smaller one by an amount substantially the same as the thickness of the wax strip. As each section of each succeeding roller is telescoped to a shorter length, the wax strips are guided to the desired superposed position. The rollers may be rotated by a series of cog wheels and cogs or by a common pulley belt 53 acting on axis shafts 54 of the rollers. The strips which are now stacked are passed between a first set of heated metal plates 55, which bond opposite edges of the wax strips. The bonded strip of wax is then cut transversely into slabs of rectangular bars or squares of appropriate length by a cutter 56 which may consist of a small knife blade operating against a block. The wax bars which are now stacked and bonded on two sides are deposited on a conveyor such as the second horizontal conveyor 32 described above and passed between a second pair of heated metal plates 35 which bond the remaining opposite sides of the wax blocks. After the latter bonding the wax blocks are cooled, dried and packaged as described above. In this modification, the preferable sequence has been described and illustrated, although, of course, the cutter 56 may be located ahead of the first set of sealing plates 55 as in Fig. 1, in which case the stacked strips would be transversely cut into wax rectangles before either pair of sides are sealed.

In both modifications of the invention the outer pair of cutters 20 will slice off narrow strips 60 along the edges of the wax sheets to provide strips or ribbons of wax of uniform width and regular edges. The outer strips 60 will be returned to the melting pot where they will be melted and re-formed into a wax sheet.

The conveyor belts in the conveyor systems may be any number of desirable sections of belting or one continuous belt, as will be appreciated by those skilled in the art.

The space between conveyor 18 and transverse conveyor 25 may be so adjusted that the wax slabs will turn over as they fall onto the transverse conveyor. Also, a trough-like arrangement (not shown) may be provided to align the sections in the stacks on the transverse conveyor before they are bonded by the heated metal plates in order that the finished wax block will be of uniform dimensions.

It will be readily understood that the size and thickness of the wax sheet may be varied by controlling the speed of rotation of the cylindrical roller, the temperature of the cooling medium and the temperature of the molten wax. Likewise the wax sheet may be cut into stirps of any desired width and the rectangular wax slabs may be cut into any desired length. Also the size of the final wax blocks may be controlled by arranging for any given number of wax rectangles to be stacked before the transverse conveyor moves them through the heated plates.

As illustrative of the process a refined paraffin wax melting at 127° F. was formed into a layer by immersing a roller into a pan of molten wax maintaining at 140–150° F. to a depth of about 1/8 inch. The surface of the roller was maintained at a temperature of about 80–90° F. by circulating tap water therethrough, and the roller was rotated at a speed sufficient to form a layer having a thickness of about 0.01–0.02 of an inch. It was found that the wax layer thus formed separated readily from the roller and could be pulled off the roller continuously as a wax sheet. The sheet is cut into the strips and rectangles, stacked and passed between the sealing plates heated to a temperature of about 135° F. to bond the pieces together at the edges of the stack, after which the blocks were cooled whereby the fused edges of the blocks are solidified.

It is believed to be unnecessary, inasmuch as data relating to the plastic range, melting and setting temperatures and thermal conductivity of all commercial waxes are readily available to those skilled in the art, to set forth further specific examples of operation describing the precise conditions under which different waxes may be molded in accordance with the teachings of the present disclosure.

It will also be readily appreciated that various types of conventional rollers superposed a predetermined and desirable distance apart may be employed in a position (not shown) in the process to provide positive pressure to the plastic sheet as it passes between a pair of the rollers to insure uniform thickness to the plastic wax sheet and thereby to finished wax blocks.

Various other changes and modifications will be apparent to those skilled in the art and it is understood that it is intended to include all such variations within the scope of the invention.

I claim:

1. A continuous process which comprises cutting a wax sheet into a plurality of uniform strips of wax, forming stacks of detached slabs of said strips, passing said stacks between heated plates to soften and lightly fuse the edges of said stacked slabs of wax, and cooling the resultant block of wax thereby solidifying the fused edges of said block into a fragile bond.

2. A continuous process which comprises cutting a wax sheet into a plurality of uniform strips of wax, transversely cutting said strips into rows of rectangular slabs of wax, moving successive rows of said slabs into superposed position in a plurality of stacks of wax slabs, and passing said stacks between heated plates to soften and lightly fuse the edges of said stacked slabs of wax and cooling the resultant block of wax thereby solidifying the fused edges of said block into a fragile bond.

3. A continuous process which comprises cutting a wax sheet into a plurality of uniform strips of wax, transversely cutting said strips into rows of rectangular slabs of wax, moving successive rows of said slabs into superposed position in a plurality of stacks of wax slabs, advancing said stacks between a pair of heated plates to fragilely bond the edges of said slabs on opposite sides of each of said stacks, moving each partially bonded stack of wax slabs between a second pair of heated plates to bond the remaining opposite sides of the stack or wax into a fragilely fused block and cooling the resulting fused block.

4. The process according to claim 3 in which said fused block is cooled by passing through a trough of water and in which the cooled block of wax is dried to remove excess water from the surfaces of the cooled block.

5. A continuous process which comprises cutting a wax sheet into a plurality of uniform strips of wax, superposing said strips into a stacked row, transversely cutting said row of wax strips into rectangular slabs of stacked sections of wax, passing the resultant stacks between heated plates to soften and lightly fuse opposite edges of each stack and cooling the resultant block of wax thereby solidifying the fused edges of said block into a fragile bond.

6. A continuous process which comprises cutting a wax sheet into a plurality of uniform strips of wax, superposing said strips into a stacked row, transversely cutting said row of wax strips into rectangular slabs of stacked sections of wax, advancing said stacks between a pair of heated plates to fragilely bond the edges of said slabs on opposite sides of each of said stacks, moving each partially bonded stack of wax slabs between a second pair of heated plates to bond the remaining opposite sides of the stacks of wax into a fragilely fused block and cooling the resulting fused block.

References Cited in the file of this patent

UNITED STATES PATENTS

| Number | Name | Date |
|---|---|---|
| 154,034 | Frederici | Aug. 11, 1874 |
| 1,583,381 | Zimmerman | May 4, 1926 |
| 2,052,005 | Root | Aug. 25, 1936 |
| 2,071,921 | Dickson | Feb. 23, 1937 |
| 2,123,155 | Groff | July 5, 1938 |
| 2,532,280 | Atkinson | Dec. 5, 1950 |
| 2,553,365 | Ferris | May 15, 1951 |